(No Model.)
W. GREAVES.
FISHING BASKET.
No. 506,909. Patented Oct. 17, 1893.
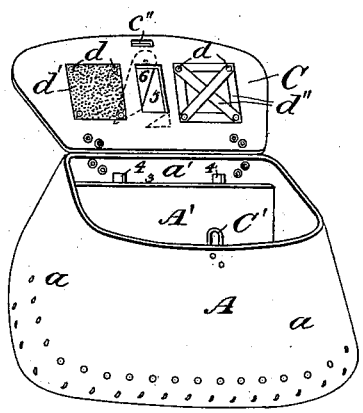
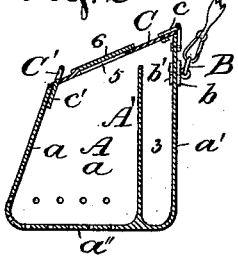
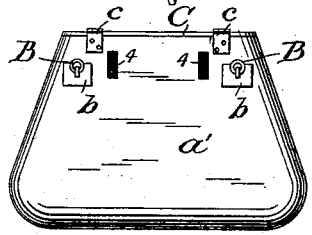
Witnesses:
Chas. Raley.
B Harvey.
Walter Greaves
Inventor.
by A. Harvey
Attorney.

UNITED STATES PATENT OFFICE.

WALTER GREAVES, OF OTTAWA, CANADA.

FISHING-BASKET.

SPECIFICATION forming part of Letters Patent No. 506,909, dated October 17, 1893.

Application filed November 25, 1892. Serial No. 453,027. (No model.)

*To all whom it may concern:*

Be it known that I, WALTER GREAVES, of the city of Ottawa, in the county of Carleton and Province of Ontario, in the Dominion of Canada, have invented certain new and useful Improvements in Fishing-Baskets; and I do hereby declare that the following is a full, clear, and exact description of the same, reference being had to the accompanying drawings, forming a part hereof.

My invention, which will be hereinafter fully set forth and claimed, relates to the angler's requisite known as a fishing basket.

The object of my invention is to provide a more durable and more convenient basket that can be readily cleaned.

Figure 1 is a perspective view of my improved fishing basket. Fig. 2 is a transverse section of the same, and Fig. 3 is a rear view of the same.

It is well known to anglers that the usual fishing basket, made of wickerwork, owing to its being of wickerwork, is very short lived; the osiers soon rot in consequence of the alternate moisture and dryness, especially at or near the bottom and complete dilapidation rapidly follows the giving way of single osiers, as effective repairs cannot be made. Also that the wickerwork does not admit of proper cleanliness. I overcome these defects by making my improved basket of indurated ware, papier maché well treated with moisture resisting preparations or the like, having its body molded integrally.

A is the body of the basket, having the front and sides $a$, back $a'$ and bottom $a''$, all made in one piece of indurated fiber, papier maché or other similar material, well saturated with water proofing preparations and made as thin as possible, consistent with durability. It is of the usual shape, i. e., tapering narrower from the bottom upward and the front and sides passing into one another by well rounded corners. The bottom $a'$ is partly or wholly perforated, as also the front and sides near the bottom, if thought desirable, to allow the water to drain off.

A' is a partition, extending from side to side so as to form a separate compartment, 3 in the rear, adapted to hold sandwich case, flask, tobacco pouch, fly book, and the like; said partition being formed integrally with the body $a\ a''$. That portion of the bottom which is under said compartment may, or may not, be perforated, as may be thought most desirable and said partition need not necessarily extend up to the rim of the basket.

B B are rings into which the ends of the shoulder strap are hooked by means of snap hooks. Said rings are hinged to plates $b$ which are riveted to the back $a'$, the rivets passing through large metallic washers, $b'$, on the inside. But in order to make an ordinary shoulder strap,—one without hooks— available, the usual mode of attachment is also provided by forming two slots, 4, through which said strap is passed.

C is the top or lid. It is hinged to the back by hinges $c$ of brass, plated metal or other non-corrosive material, being riveted in place through suitable washers. Any suitable front fastening may be used, such as a staple C' on a plate $c'$ secured to the body and passing through a slot $c''$ in the lid, thus permitting of the use of a pin or padlock. Two sets of pins or buttons $d$ are placed on the inner face of the lid, each set securing a piece of felt or flannel $d'$ and elastic bands $d''$, the latter serving the purpose of carrying small articles and the former to carry or receive flies when rapid changes are desired to be made. An opening, 5, for passing in the fish, is made approximately in the center over the front compartment and provided with a swivel cover 6.

I claim as my invention—

1. A fishing basket having a partly perforated body molded integrally of indurated fiber or the like material and provided with a top or lid secured thereto by riveted hinges and fastenings and the back provided with plates riveted thereto and carrying rings for the attachment of the shoulder strap, and said back also provided with slots, substantially as set forth.

2. In a fishing basket, the combination of the front and sides $a$, back $a'$ and bottom $a''$ partly perforated and the partition A' forming a compartment 3, all molded integrally in indurated fiber or the like material, the rings B on plates $b$ and washers $b'$ secured to the back, strap slots 4 in said back, lid C hinged to the body with riveted hinges c and provided with suitable riveted fastenings in front, and the buttons d, pieces of cloth or flannel d' and elastic bands d'' secured to the inside of said lid, and an opening 5 approximately in the center of said lid, substantially as set forth.

In testimony whereof I have signed in the presence of the undersigned witnesses.

WALTER GREAVES.

Witnesses:
A. HARVEY,
A. TROWSE.